US012006030B2

(12) United States Patent
Geuther et al.

(10) Patent No.: US 12,006,030 B2
(45) Date of Patent: Jun. 11, 2024

(54) DISTRIBUTED ELECTRIC PROPULSION MODULAR WING AIRCRAFT WITH BLOWN WING AND EXTREME FLAPS FOR VTOL AND/OR STOL FLIGHT

(71) Applicant: UNITED STATES OF AMERICA AS REPRESENTE BY THE ADMINISTRATOR OF NASA, Washington, DC (US)

(72) Inventors: Steven C. Geuther, Hampton, VA (US); David D. North, Williamsburg, VA (US); Robert G. McSwain, Yorktown, VA (US); Michael D. Patterson, Yorktown, VA (US); Gregory Howland, Yorktown, VA (US); Jared S. Fell, Yorktown, VA (US); Christopher M. Cagle, Yorktown, VA (US); Xiaofan Fei, Bellevue, WA (US); Siena K. S. Whiteside, Poquoson, VA (US); David A. Hare, Smithfield, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 178 days.

(21) Appl. No.: 16/857,954

(22) Filed: Apr. 24, 2020

(65) Prior Publication Data
US 2021/0331791 A1    Oct. 28, 2021

(51) Int. Cl.
*B64C 29/00*    (2006.01)
*B64C 9/00*    (2006.01)
(Continued)

(52) U.S. Cl.
CPC ............ *B64C 29/0025* (2013.01); *B64C 9/00* (2013.01); *B64C 9/04* (2013.01); *B64C 11/46* (2013.01);
(Continued)

(58) Field of Classification Search
CPC ..... B64C 29/0025; B64C 11/46; B64C 13/02; B64C 39/08
See application file for complete search history.

(56) References Cited

U.S. PATENT DOCUMENTS 3,166,271 A *  1/1965  Zuck ...................... B64D 35/00
                                            244/66
3,223,356 A  12/1965  Alavarez-Calderon
(Continued)

FOREIGN PATENT DOCUMENTS

EP    2738091 A1    4/2014
EP    3124379 A1    2/2017
(Continued)

OTHER PUBLICATIONS

Antcliff, Kevin R., et al. "Baseline Assumptions and Future Research Areas for Urban Air Mobility Vehicles." AIAA SciTech Forum, Jan. 7-11, 2019, San Diego, California, pp. 1-18.
(Continued)

*Primary Examiner* — Joshua J Michener
*Assistant Examiner* — Ashesh Dangol
(74) *Attorney, Agent, or Firm* — M. Bruce Harper; Robin W. Edwards; Trenton J. Roche

(57) ABSTRACT

An aircraft wing configuration for a vertical or a short take-off and landing aircraft having a plurality of propeller-blown wings mounted at different longitudinal locations along a fuselage of the vertical take-off and landing aircraft, producing two or more lifting surfaces, fixed at a predetermined acute wing angle greater than 0° and substantially less
(Continued)

than 90° relative to a horizontal plane, and having a plurality of flaps disposed behind the wings. The configuration has a plurality of propellers distributed in front of the plurality of wings producing two or more lifting surfaces and mounted such that the wings are externally blown by forced airstreams from the propellers. The propellers produce distributed thrust components, and the plurality of flaps are in the forced airstreams of the propellers when one or more of the flaps is in an extended position.

20 Claims, 14 Drawing Sheets

(51) Int. Cl.
| | |
|---|---|
| B64C 9/04 | (2006.01) |
| B64C 11/46 | (2006.01) |
| B64C 13/02 | (2006.01) |
| B64C 39/08 | (2006.01) |
| B64D 27/24 | (2006.01) |
| B64D 31/02 | (2006.01) |

(52) U.S. Cl.
CPC ............. *B64C 13/02* (2013.01); *B64C 39/08* (2013.01); *B64D 27/24* (2013.01); *B64D 31/02* (2013.01); *B64C 2009/005* (2013.01)

(56) References Cited

U.S. PATENT DOCUMENTS

| | | | |
|---|---|---|---|
| 3,972,490 | A | 8/1976 | Zimmermann et al. |
| 5,280,863 | A * | 1/1994 | Schmittle ................ B64C 29/02 244/46 |
| 5,374,010 | A * | 12/1994 | Stone ................. B64C 29/0025 244/45 R |
| 6,918,244 | B2 | 7/2005 | Dickau |
| 7,159,817 | B2 | 1/2007 | Vandermey et al. |
| 8,162,256 | B2 | 4/2012 | Goossen et al. |
| 9,120,560 | B1 | 9/2015 | Armer et al. |
| 9,868,523 | B2 | 1/2018 | Hymer |
| 10,077,108 | B2 | 9/2018 | Lauder |
| 10,351,235 | B2 | 7/2019 | Karem et al. |
| 10,518,875 | B2 | 12/2019 | Judas et al. |
| 2017/0029131 | A1 | 2/2017 | Steinwandel et al. |
| 2018/0065741 | A1* | 3/2018 | Vondrell ................ B64C 11/28 |
| 2019/0016453 | A1 | 1/2019 | Skulskis |
| 2019/0233099 | A1 | 8/2019 | Lindsey et al. |
| 2019/0291863 | A1* | 9/2019 | Lyasoff ................ G05D 1/102 |
| 2019/0389573 | A1* | 12/2019 | Kahou ................ B64U 30/20 |
| 2021/0261245 | A1* | 8/2021 | Tao ................ B64C 11/28 |
| 2021/0323662 | A1* | 10/2021 | Giurca ................ B64C 29/0025 |

FOREIGN PATENT DOCUMENTS

| | | |
|---|---|---|
| EP | 3594113 A1 | 1/2020 |
| WO | 2019005131 A1 | 1/2019 |

OTHER PUBLICATIONS

Bertelsen, William D., et al. "History of Deflected Slipstream VTOL Aircraft", American Helicopter Society 61st Annual Forum, Jun. 1-3, 2005, Grapevine, Texas, pp. 1-18.

Bacchini, Alessandro, et al. "Electric VTOL Configurations Comparison," Aerospace, 2019, vol. 6, No. 26. 6, pp. 1-19.

Robert G. McSwain et al., An Experimental Approach to a Rapid Propulsion and Aeronautics Concepts Testbed, NASA/TM-2020-220437 (Jan. 2020) (downloaded from https://ntrs.nasa.gov/api/citations/20200000698/downloads/20200000698.pdf on Jun. 26, 2023).

David Meade, Langley Aerodrome Created to Explore Urban Air Mobility, Apr. 25, 2019 (downloaded from https://www.nasa.gov/feature/langley/langley-aerodrome-created-to-explore-urban-air-mobility on Jun. 27, 2023).

* cited by examiner

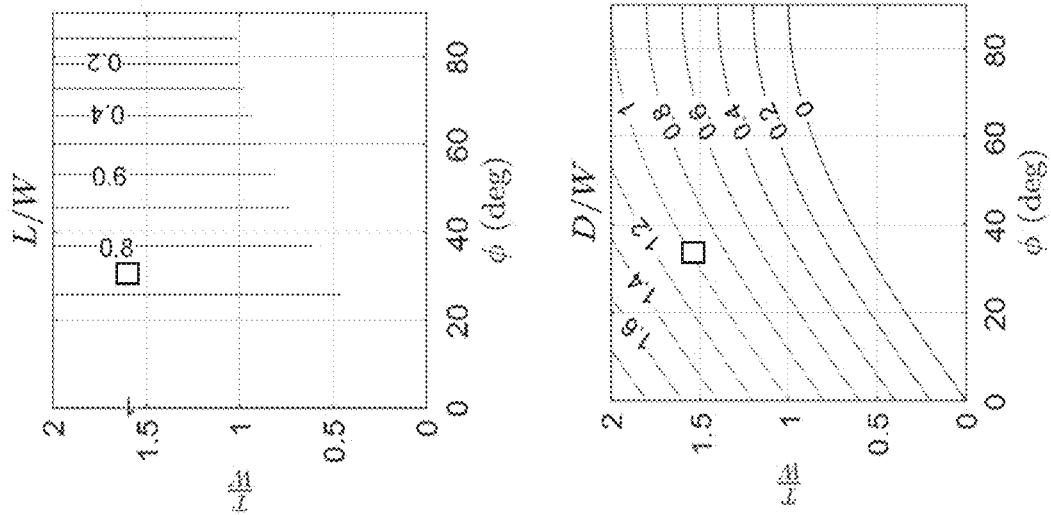
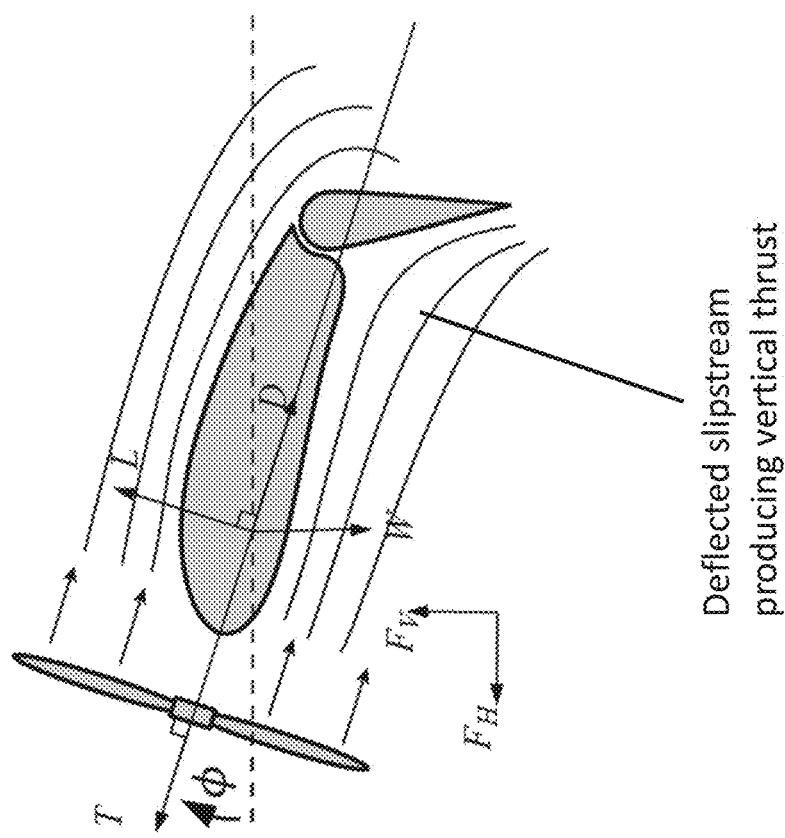
Figure 3C

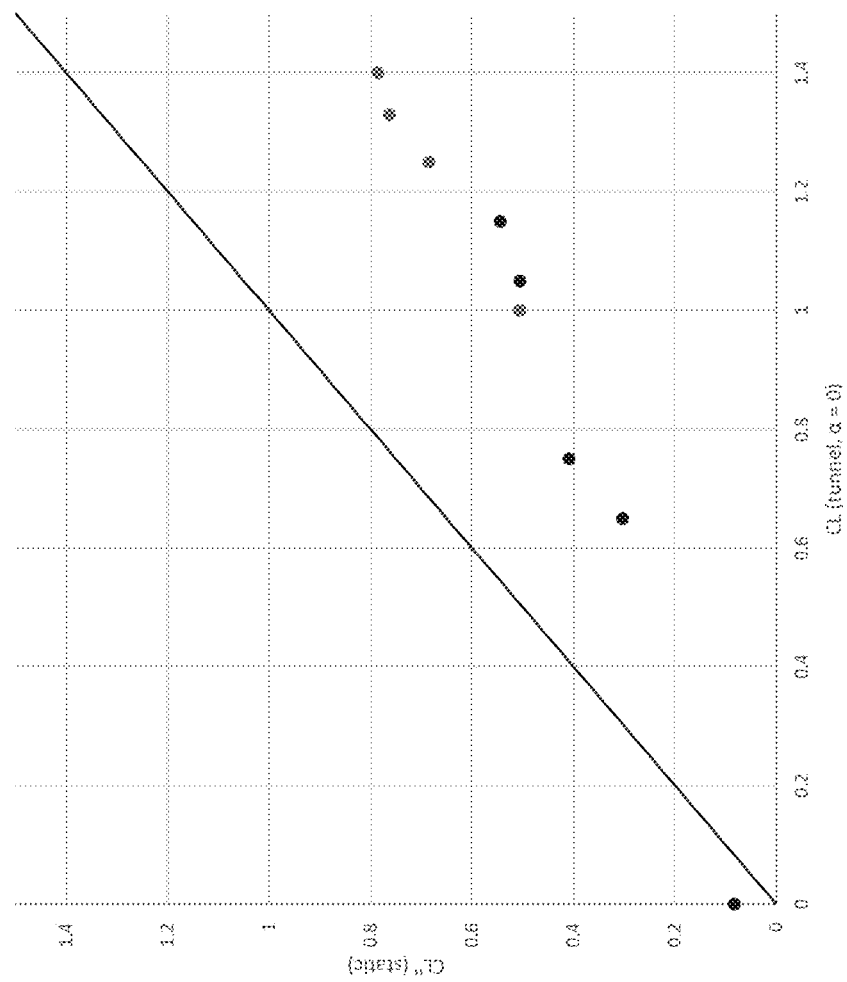

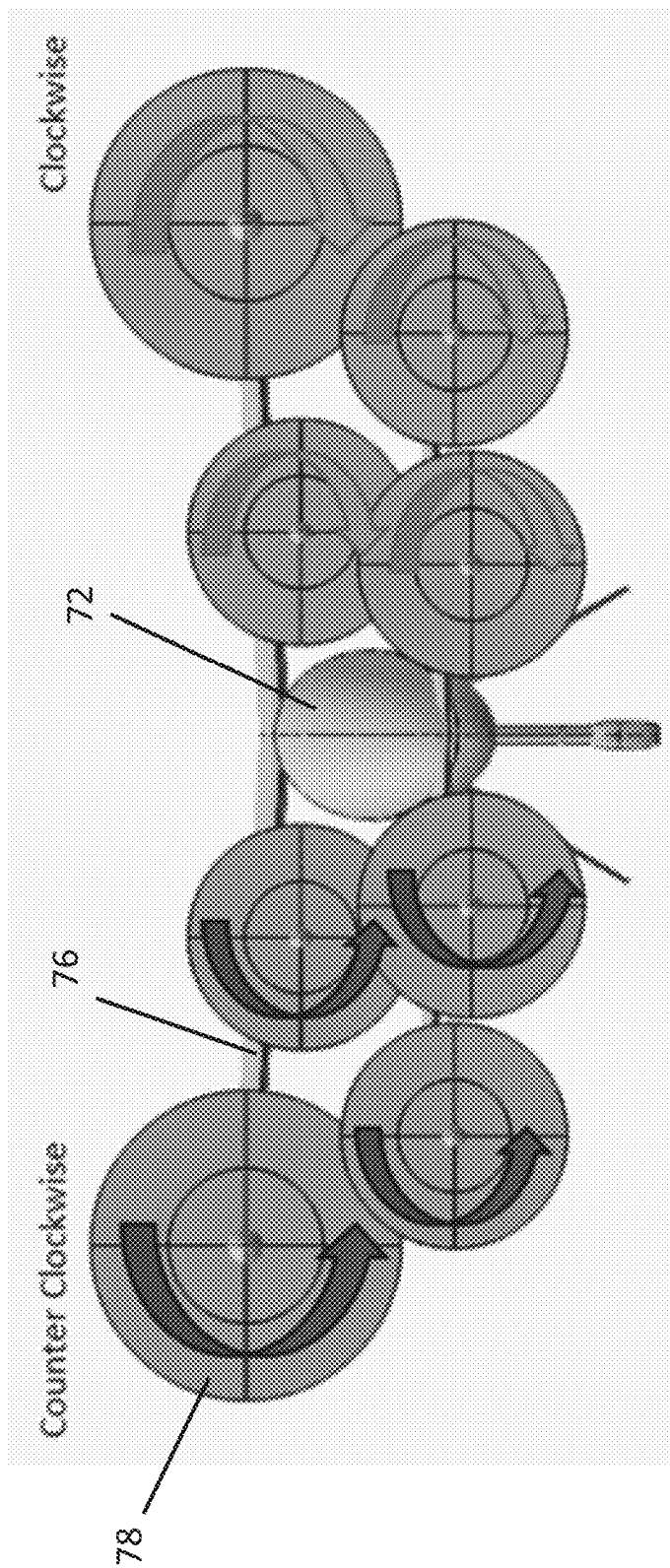

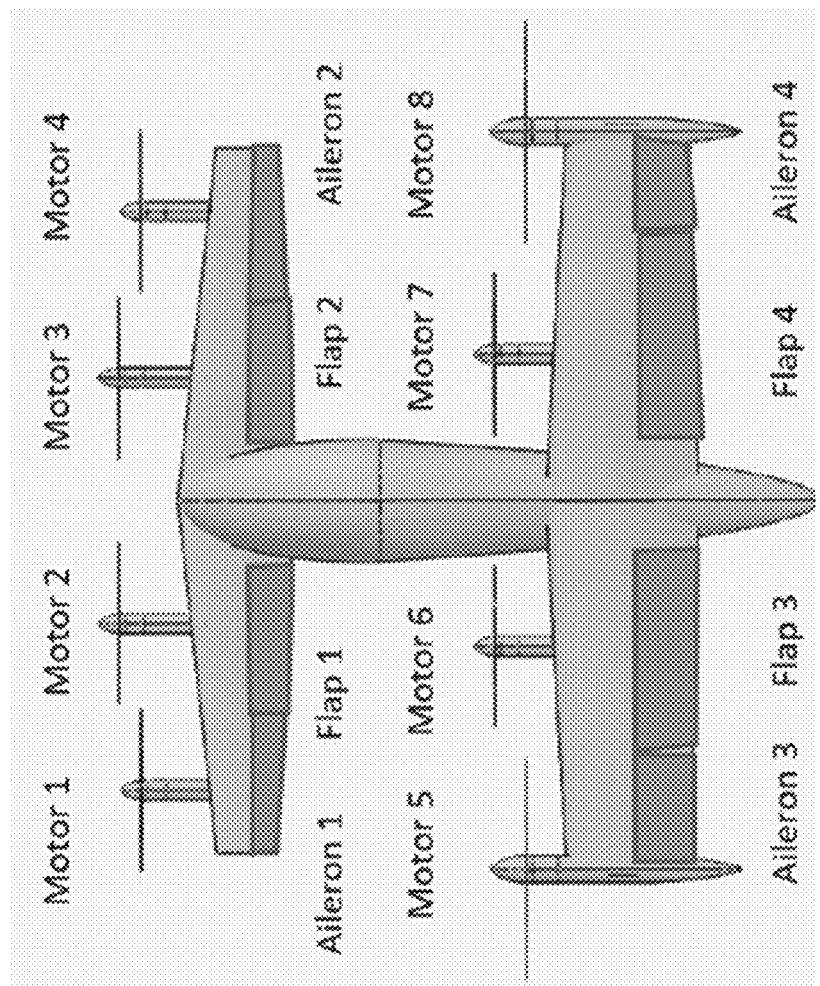

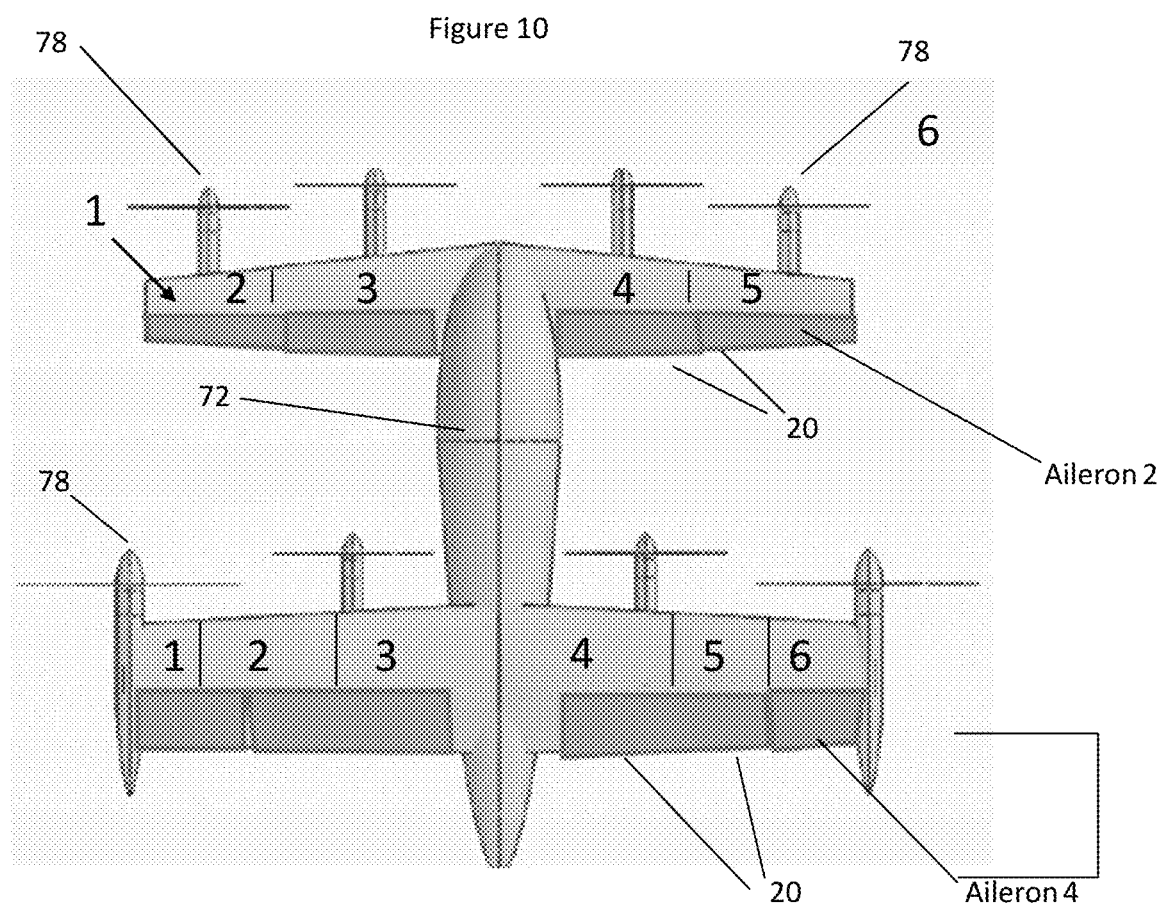

DISTRIBUTED ELECTRIC PROPULSION MODULAR WING AIRCRAFT WITH BLOWN WING AND EXTREME FLAPS FOR VTOL AND/OR STOL FLIGHT

STATEMENT REGARDING FEDERALLY SPONSORED RESEARCH OR DEVELOPMENT

The invention described herein was made by an employee/employees of the United States Government and may be manufactured and used by or for the Government of the United States of America for governmental purposes without the payment of any royalties thereon or therefore.

BACKGROUND OF THE INVENTION

A variety of vertical take-off and landing (VTOL) aircraft are in use today. A helicopter is a classic example of a VTOL aircraft. However, the forward flight speed and efficiency of a conventional helicopter is significantly inferior to that of a conventional fixed wing aircraft. Additionally, the complexity of the helicopter's mechanical linkages contributes significantly to the crafts high cost and demanding maintenance requirements.

Efforts to improve the forward flight speed of VTOL aircraft have designs with articulating rotors and/or wings or other toward other means of vectoring thrust. The V-22 Osprey is a twin rotor helicopter with rotors that tilt forward. The Harrier AV 8A accomplishes vertical and horizontal thrust by articulating movable nozzles, which are used to vector the thrust from its turbofan engines. Other VTOL aircraft include the Lockheed Martin Joint Strike Fighter (JSF) which has a 3-bearing swivel duct, a variable nozzle, and a lift fan. This aircraft has rotational lift nozzles near the center, and yaw, pitch and roll nozzles that stabilize the aircraft in a hover. Other VTOL aircraft have designs with a horizontal lift fan driven by exhaust air, or have included bypass turbo fans disposed in the fuselage.

The tilt rotor aircraft designs as noted above attempt to combine the forward flight dynamics of a fixed wing aircraft with the vertical take-off and land capabilities of a helicopter. However, tilt rotor aircraft have several distinctive drawbacks.

One drawback is that tilt rotor aircraft must overcome negative angular moments created by tilting their spinning rotors 90 degrees during VTOL transitions. These angular moments produce a nose up force when transitioning from vertical to horizontal flight and a nose down force when transitioning from horizontal to vertical flight. These forces create inherently unstable conditions during the transitions between vertical and horizontal flight, and vice versa. In practice, this inherent instability has been largely responsible for a poor safety record for this type of aircraft.

Another drawback of the tilt rotor design is the fact that, if the propulsion rotation system should fail, the craft is rendered incapable of landing as a conventional fixed wing aircraft. This occurs because the rotors are so large that they would strike the ground if the aircraft were to be landed (like a conventional fixed wing aircraft) with the propellers spinning on a horizontal axis.

Another example of a VTOL aircraft is a drone. VTOL drones typically incorporate tilt rotors (similar to the designs noted above), such as two large propellers mounted to the ends of an abbreviated wing designed to tilt the propellers from a vertical position for VTOL maneuvering to a horizontal position for normal flight. This "tilt-rotor" design is effective but is difficult to engineer and construct, and is inherently unstable between the vertical and horizontal positions of the propellers.

Some VTOL drones utilize redirected thrust, which (similar to that noted above) incorporate turbofan/jet engines that produce tremendous amounts of directed thrust, which is redirected downward for VTOL maneuvers. VTOL drones that incorporate redirected thrust systems are difficult to engineer and construct and are unstable between the direct and redirected thrust orientations.

Related to VTOL aircraft are vertical/short take-off and landing (V/STOL) aircraft and short take-off and landing (STOL) aircraft. The V/STOL aircraft is an aircraft that is able to take off or land on short runways. A V/STOL aircraft may nevertheless be able to take off vertically (if it does not have a heavy payload) and land vertically (i.e., with no runway) much like the capability of a VTOL aircraft. In general, a rolling takeoff can reduce the amount of thrust required to lift a winged aircraft from the ground (as compared to that needed for a pure vertical takeoff), and hence increases the payload and range that can be achieved for a given thrust for an aircraft. Thus, even a V/STOL aircraft which has the capability to hover with no forward motion (as in a VTOL aircraft) may still use a runway for takeoff. On the other hand, a STOL aircraft would not have the capability to hover with no forward motion or a strong headwind and would use a runway for takeoff and landing. Needless to say, a VTOL capability allows for the same aircraft when equipped with appropriate landing gear to function as a VTOL aircraft or a V/STOL aircraft. Furthermore, the same design principles and technologies for VTOL aircraft can be utilized to produce STOL aircraft, which must operate with some ground roll for takeoff and landing, that have the advantage of utilizing less power and energy for takeoff when compared to pure VTOL designs.

The following patent documents (the entire contents of which are incorporated herein by reference) are considered to be characteristic of the background art:

1. U.S. Pat. No. 3,223,356 entitled "Deflected slipstream system for aircraft."
2. U.S. Pat. No. 5,740,010 entitled "Deflected slipstream vertical lift airplane structure."
3. U.S. Pat. No. 9,120,560 entitled "Vertical take-off and landing aircraft;"
4. U.S. Pat. No. 7,159,817 entitled "Vertical take-off and landing (VTOL) aircraft with distributed thrust and control;"
5. U.S. Pat. No. 8,162,256 entitled "Launch and capture systems for vertical take-off and landing (VTOL) vehicles;"
6. US Pat. Publication No. US Pat. Publication No. 2019/0233099 entitled "Methods and systems for energy-efficient take-offs and landings for vertical take-off and landing (VTOL) aerial vehicles;"
7. US Pat. Publication No. US2019/0016453 entitled "Vertical take-off and landing (VTOL) aircraft and a propulsion system for a vehicle vertical take-off and landing (VTOL);"
8. U.S. Pat. No. 10,077,108 entitled "Vertical take-off and landing (VTOL) aircraft with exhaust deflector;"
9. U.S. Pat. No. 10,518,875 entitled "Vertical take-off aircraft;"
10. U.S. Pat. No. 10,351,235 entitled "EVTOL aircraft using large, variable speed tilt rotors;"
11. U.S. Pat. No. 9,868,523 entitled "Vertical take-off and landing (VTOL) fixed wing aircraft;"

12. U.S. Pat. No. 6,918,244 entitled "Vertical take-off and landing aircraft propulsion systems;"
13. U.S. Pat. No. 3,972,490 entitled "Trifan powered VSTOL aircraft"
14. US Pat. Publication No. 2019/0291863, entitled "Vertical takeoff and landing aircraft with tilted-wing configurations;"
15. WO2019/005131, entitled "Vertical take-off and landing aircraft with passive wing tilt;"
16. EP3594113, entitled "An apparatus for adjusting the center of gravity of a vertical take-off and landing aircraft;"
17. CN 106394910, entitled "Hybrid Electric Drive Train For VTOL Drones;"
18. EP 2738091, entitled "Vertical take-off and landing (VTOL) aerial vehicle and method of operating such a VTOL aerial vehicle;"
19. Ancliff et al., "Baseline Assumptions and Future Research Areas for Urban Air Mobility Vehicles" in AIAA SciTech Forum, 7-11 Jan. 2019, San Diego, California, pp. 1-18.
20. Bertelsen et al., "History of Deflected Slipstream VTOL Aircraft" presented at the American Helicopter Society 61st Annual Forum, Grapevine, TX, Jun. 1-3, 2005, pp. 1-18.
21. Bacchini et al., "Electric VTOL Configurations Comparison" in Aerospace 2019, 6, 26; doi:10.3390/aerospace6030026.

BRIEF SUMMARY OF THE INVENTION

The present invention is directed to wing structures including propulsion for a vertical take-off and landing (VTOL) aircraft and VTOL aircraft employing the wing structures.

One embodiment of the invention is an aircraft wing configuration for a vertical or a short take-off and landing aircraft. The configuration has a plurality of propeller-blown wings a) mounted at different longitudinal locations along a fuselage of the vertical take-off and landing aircraft, b) producing two or more lifting surfaces, c) fixed at a predetermined acute wing angle greater than 0° and substantially less than 90° relative to a horizontal plane, and d) having a plurality of flaps disposed behind the wings. The configuration has a plurality of propellers a) distributed in front of the plurality of wings producing two or more lifting surfaces and b) mounted longitudinally to a fuselage of the aircraft such that the wings are externally blown by forced airstreams from the propellers. The propellers produce distributed thrust components laterally along the wings and longitudinally across the aircraft, and the plurality of flaps are in the forced airstreams of the propellers when one or more of the flaps is in an extended position. When the flaps are pointed in a downward direction relative to the wing at a flap angle below a retracted position and with the wings fixed at the acute wing angle relative to the horizontal plane, the forced airstream deflected downward by the flaps generates a vertical lift component.

Another embodiment of the invention is a vertical take-off and landing aircraft utilizing the aircraft wing configuration noted above.

Another embodiment of the invention is a short take-off and landing aircraft utilizing the aircraft wing configuration noted above.

Another embodiment of the invention is a distributed propulsion system providing thrust to the aircraft wing configuration noted above.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 3C is a schematic depiction of a wing structure experiencing a deflected slipstream.

FIG. 6A is a schematic depicting a comparison of lift performance under blown and uniform freestream conditions.

FIG. 8 is a schematic depiction of propeller rotation pattern for the VTOL aircraft depicted in FIG. 7.

FIG. 9 is a schematic depiction of a top down view of the VTOL aircraft depicted in FIG. 7.

FIG. 10 is a schematic depiction of a VTOL aircraft utilizing the wing structure depicted in FIG. 1.

DETAILED DESCRIPTION OF THE INVENTION

Figure 1:
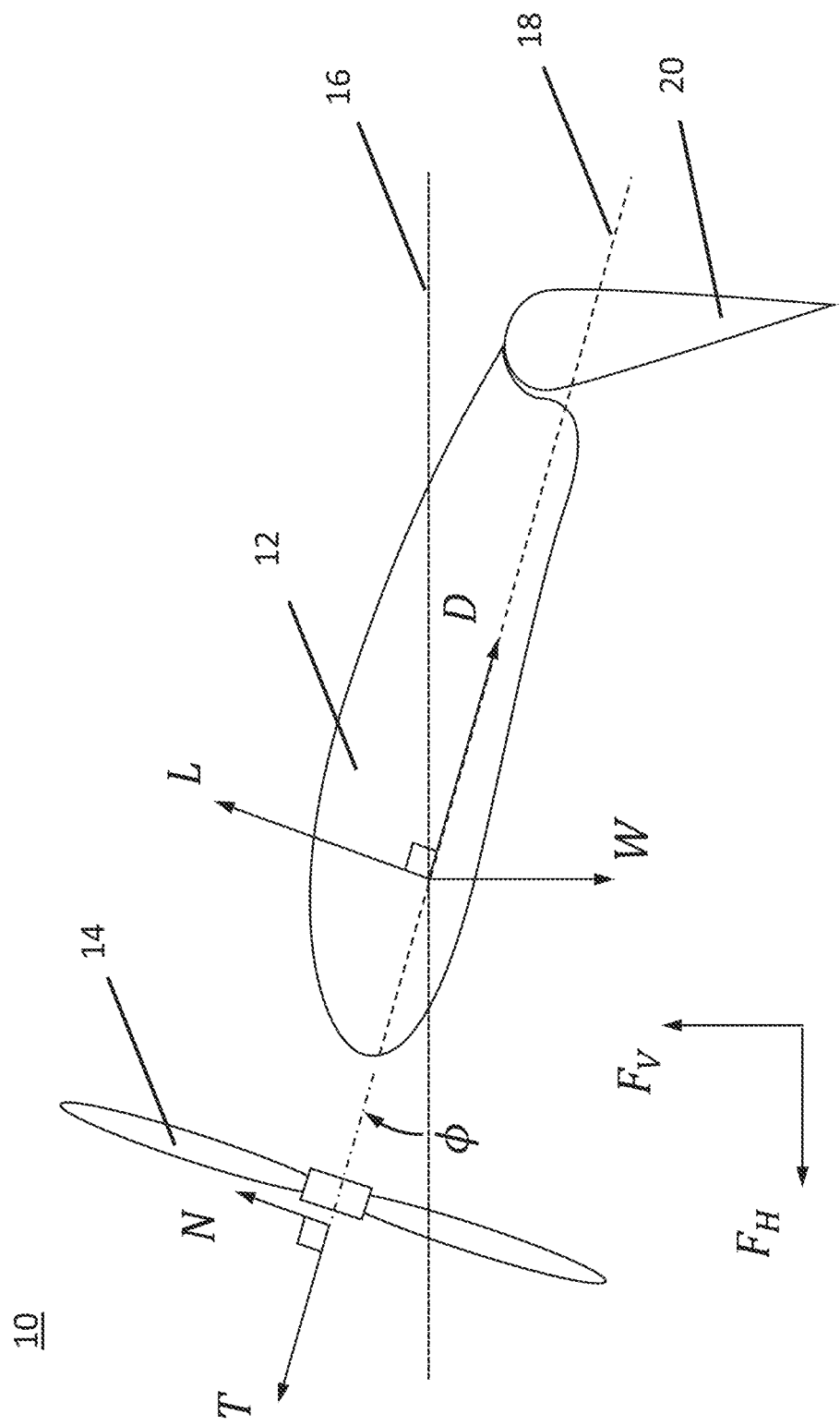
FIG. 1 is a schematic showing a wing structure of the present invention and the forces on the wing structure when experiencing a deflected slipstream configuration.

There are significant complications (weight and operations) with several VTOL configurations as noted above. More specifically, configurations that use separate lift-thrust mechanisms have performance hindering equipment onboard for either the take-offs or cruise, which is equipment that is not being used in either vertical take-off or for horizontal thrust. Tilt-wing aircraft have complicated transition periods, where, if not scheduled perfectly, can cause catastrophic results by either large pitching moments or stalling the wings for a long time and not having sufficient propulsion. In addition, these configurations, along with other VTOL concepts, have large mass increases to achieve these capabilities from the additional mechanisms or propulsion needed. In short, for many decades, the aviation industry has attempted to build a vehicle that can combine the speed and efficiency of an airplane with the vertical takeoff and landing of a rotorcraft. The present invention addresses this long-standing problem.

Indeed, in one aspect of the present invention, the disadvantages noted above are avoided along with the realized aircraft being safe, reliable, optionally electric-powered, and lightweight, in order to increase the flight performance. Furthermore, in one aspect of the invention, passenger ride quality is improved by accomplishing a preferred benign or substantially non-existent transition between hover and forward flight conditions.

In another aspect, the present invention is directed to a distributed propulsion system (preferably electric-powered) with a predetermined wing tilt and a blown wing, with flaps providing vertical thrust and adjustable in deployment between a fully retracted position and a fully extended position such that adjustments of the flap angle can be used in order to create the above noted preferred benign or substantially non-existent transition period that is also capable of safe vertical take-off and landing (VTOL) operations. In one embodiment, the present invention uses a slight wing angle, which is preferably at a fixed angle $\phi$ (shown below) and uses flaps that deflect the slipstream of the propellers in a manner that negates forward movement and produces a net upward force. The effectiveness of the flap per wing, in one embodiment, reduces the wing angle down to an angle $\phi$ (~15 degrees) which permits VTOL without necessarily having to tilt the wings/rotor structure.

The present invention has discovered an aircraft wing structure design such that the aircraft a) does not require near-90° wing tilt for takeoff/landing, b) is controllable, and c) has a transition from vertical take-off to horizontal flight with little change in vehicle attitude and with substantially no jerks or accelerations in the forward direction or in the angular disposition of the VTOL aircraft. As described below, this structure in general has at least one wing having a body axis (chord line) extending therethrough and mounted to a fuselage of the vertical take-off and landing aircraft; at least one propeller disposed in front of the wing; at least one flap configured to be adjusted between a retracted position and a fully extended position; and during an open air hover operation, the flap is fixed relative to a horizontal plane at an acute angle less than 90° and the flap is fully extended such that a resultant force from a lift L of the wing, a weight of the aircraft W, a thrust T of the propeller, and a drag D of the wing is substantially zero For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Also, characteristics of the invention are often described with the word "substantially" meaning that deviations from the characteristic being described are less than 10% of the norm and more preferably less than 5% of the norm, and still more preferably less than 2% of the norm. The longitudinal axis of an aircraft is generally a straight line through an aircraft's nose and running to the endpoint of the fuselage. It is the axis around which the aircraft rolls, in conventional fixed wing aircraft typically controlled by the ailerons. The lateral axis is parallel to the wings and generally passes through the aircraft's center of gravity. It is the axis around which the aircraft pitches, typically controlled by elevators. Finally, the vertical axis is normal or perpendicular to the plane formed by the longitudinal and lateral axes; the vertical axis is parallel to the aircraft's primary lift vector and in level flight its weight vector. It is the axis around which the aircraft yaws, controlled by the vertical structure or rudder.

FIG. 1 is a schematic showing a wing structure 10 of the present invention (including the propulsion mechanism), and the forces on the wing structure 10 when using a deflected slipstream configuration. In a deflected slipstream configuration, flap elements (single plain or double plain) are tilted through large angles, but the main wing structure 10 relative to the fuselage does not tilt. In order for an aircraft to maintain a hover state, the net forces in the vertical and horizontal directions must be zero. For the deflected slipstream configuration consisting of a wing 12 being blown (partially or completely) by propellers 14, these forces can be decomposed into those on the wing 12 and those on the propellers 14, as illustrated in FIG. 1. The forces on the propeller 14 are thrust (T) and normal force (N). The forces on the wing 12 are lift (L) and drag (D), defined with respect to the incoming slipstream, and the aircraft weight (W). Additionally, the entire wing structure 10 with the propulsion system is tilted at angle $\phi$ relative to the horizontal plane 16. Note that it is assumed that the propeller axis is parallel to the wing body axis 18. The wing structure includes a flap 20 at the rear of the wing 12 opposite the propeller 14.

In one embodiment of the invention, to solve for the wing forces, a system of equations is formed by expressing the vertical ($F_V$) and horizontal ($F_H$) forces as the sum of their respective force components and setting both equal to zero. This system of equations is then solved for the required lift and drag as a function of thrust, weight, and tilt angle $\phi$. As shown in FIG. 1, the tilt angle $\phi$ is that of the wing body axis 18 relative to horizontal plane 16. To understand how these required forces translate into requirements on the wing, the lift and drag values were converted to their respective force coefficients. However, because there exists no freestream velocity in the hover state with which to calculate a dynamic pressure, momentum theory is used to calculate downstream slipstream velocity.

In one embodiment of the invention, the wing structure 10 itself does not tilt relative to the fuselage of the aircraft. Stated differently, in one embodiment of the invention, the only mechanism adjustable from vertical to horizontal thrust is the mechanism for adjusting the flap. The capability of adjustment with the flap mechanism avoids the need for a mechanism for tilting the wings/rotor, and thereby eliminates weight and complication of such a mechanism. In this embodiment of the invention, the transition to horizontal thrust would involve only a "transition" that would include a slight change in attitude of the aircraft. Here, "slight change in attitude" refers to the difference between the attitude of the aircraft when in hover (with flaps fully deflected), and the attitude of the aircraft when in cruise mode (with flaps fully retracted).

To solve for the wing forces, the system of equations shown in Equations 1 and 2 is formed by expressing the net vertical ($F_V$) and horizontal ($F_H$) forces as the sum of their respective force components and setting both equal to zero. This system of equations is then solved for the required lift and drag as a function of thrust, weight, and tilt angle, as expressed in Equations 3 and 4. Propeller normal force is assumed to be negligible because the inflow into the propeller is expected to be largely normal to the propeller plane in open air hover.

$$F_V = T \sin \phi + N \cos \phi + L \cos \phi - D \sin \phi - W = 0 \quad (1)$$

$$F_H = T \cos \phi - N \sin \phi - L \sin \phi - D \cos \phi = 0 \quad (2)$$

$$D = T - W \sin \phi \quad (3)$$

$$L = W \cos \phi \quad (4)$$

Figure 2B:
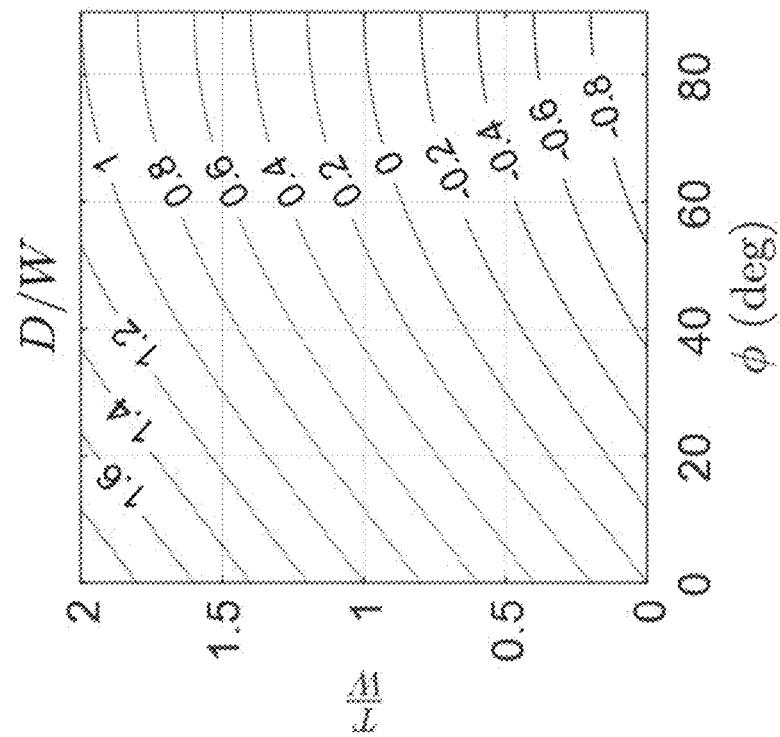
FIG. 2B is a schematic depicting drag-to-weight (D/W) ratios as a function of tilt angle and thrust-to-weight ratio (T/W).
Figure 2A:
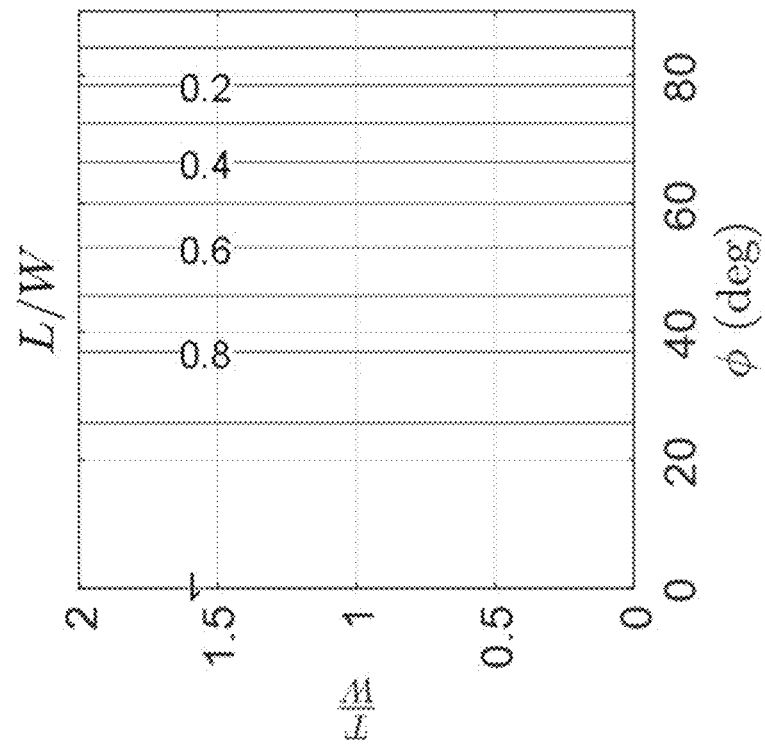
FIG. 2A is a schematic depicting lift-to-weight (L/W) ratios as a function of tilt angle and thrust-to-weight ratio (T/W).

FIG. 2A is a schematic depicting lift-to-weight (L/W) ratios as a function of tilt angle and thrust-to-weight ratio (T/W). FIG. 2B is a schematic depicting drag-to-weight (D/W) ratios as a function of tilt angle and thrust-to-weight ratio (T/W). FIGS. 2A and 2B show solutions for low and high tilt angles (ϕ) in order to maintain hover.

With respect to FIG. 2A, the values shown are useful to determine a target of lift performance for a wing on the basis of particular values defining conditions of wing angle and propeller thrust. For a particular predetermined value at which a wing has tilt angle Ø, and a particular value of T/W, the wing must generate a L/W value (representing a particular type of wing's aerodynamic lift performance) in a quantity which lies on the field. To illustrate several alternative potential target values, functions illustrating several constant L/W values are shown. FIG. 2B is used in a similar fashion, but the input values are used to indicate a D/W value (representing a particular type of wing's aerodynamic lift performance) that the same wing must generate for the same tilt angle Ø and T/W.

Therefore, use of the indicated values shown in FIGS. 2A and 2B constrain the design of a wing, such that it is configured to generate adequate vertical force for an aircraft to hover under the weight W of the aircraft, when the wing is angled at a predetermined tilt angle Ø and a contemporaneous amount propeller thrust T/W. Certain regions of the data shown in FIGS. 2A-B describe intuitively nonsensical solutions, by requiring negative drag.

Figure 3B:
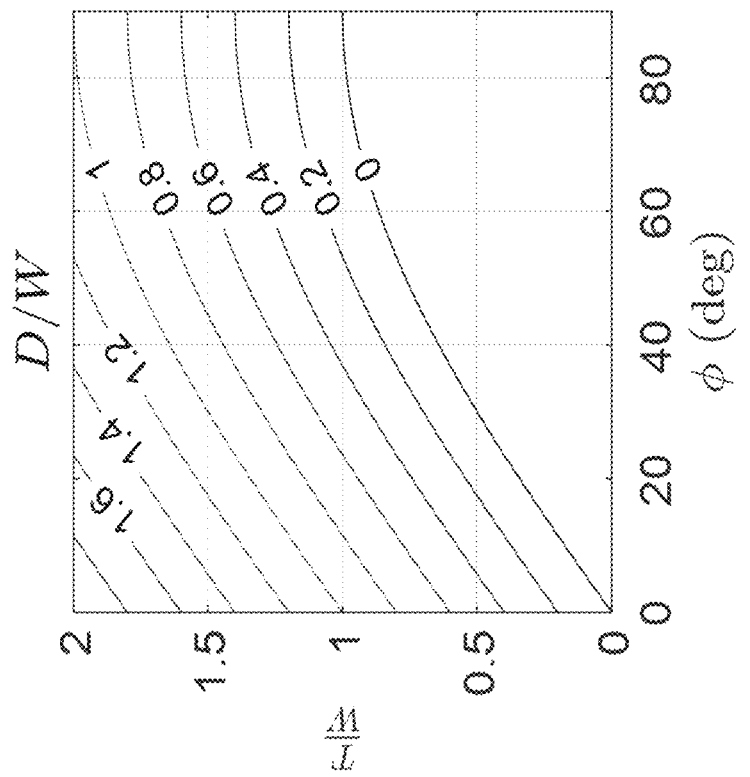
FIG. 3B is a schematic depicting drag-to-weight (D/W) ratios of FIG. 2B, but omitting regions of negative drag.
Figure 3A:
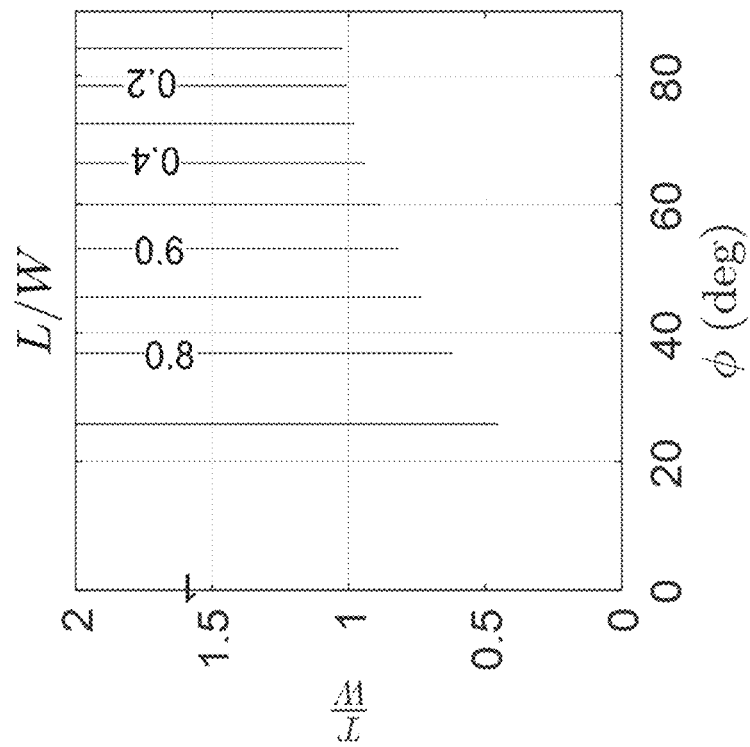
FIG. 3A is a schematic depicting the lift-to-weight (L/W) ratios of FIG. 2B, but omitting regions of negative drag.

While it is possible for a wing to produce "negative drag" (i.e., negative drag-to-weight ratios) from a wing by swirl recovery, this is only applicable under conditions of small flap deflections and low values of wing drag. For at least one embodiment, though, the wing must function in open air hover aircraft flight by comprising large flap deflections and large values of drag, mitigating swirl recovery. FIGS. 3A and 3B show the same values shown in FIGS. 2A and 2B, respectively, but omit regions of negative drag. Therefore, FIGS. 3A-3B are useful for the same use as FIGS. 2A-2B for showing solutions for low and high tilt angles (ϕ) in order to maintain hover.

FIG. 3C is a schematic depicting on the left-side a wing structure experiencing a deflected slipstream and on the right-side the solution space for low and high tilt angles (ϕ) in order to maintain hover. When the L/W value and the D/W value of a wing design (and its propulsion system) are known from experience or from wind tunnel experimentation, then the curves in 3A and 3B can be used to estimate the needed wing angle and thrust (or thrust to weight), that the aircraft would need to achieve both vertical and horizontal maintenance in an open air hover state. As illustrated on the right-side of FIG. 3C, for a wing structure having a L/W value of 0.9 and a D/W value of 1.0, then for an open hover state the wing or tilt angle Ø of 30° and an engine thrust to weight of 1.5 would be needed. See solid box positions.

To understand how the required forces would translate to requirements on the wing, the lift and drag values could be converted to their respective force coefficients. However, because there exists no freestream velocity in the hover state with which to calculate a dynamic pressure, downstream slipstream velocity is calculated via momentum theory, instead. Equation 5 expresses downstream slipstream velocity ($V_s$) as a function of the disk area (A) and thrust (T). The required wing lift and drag coefficients can then be calculated with Equations 6 and 7, where $S_b$ is the blown wing area and the double prime notation follows Kuhn and Draper's notation for values normalized by slipstream velocity as described in Kuhn, R. E. and Draper, D. W., "An Investigation of A Wing-Propeller Configuration Employing Large-Chord Plain Flaps and Large-Diameter Propellers for Low-Speed Flight and Vertical Take-Off," Tech. Rep. TN 3307, National Advisory Committee for Aeronautics, 1954 (the entire contents of which are incorporated herein by reference).

$$T = \dot{m}\Delta V = \frac{1}{2}\rho V_s^2 A \quad (5)$$

$$V_s = \sqrt{\frac{2T}{\rho A}}$$

$$C_L'' = \frac{L}{\frac{1}{2}\rho V_s^2 S_b} = \frac{L}{T\frac{S_b}{A}} \quad (6)$$

$$C_D'' = \frac{D}{\frac{1}{2}\rho V_s^2 S_b} = \frac{D}{T\frac{S_b}{A}} \quad (7)$$

Figure 4B:
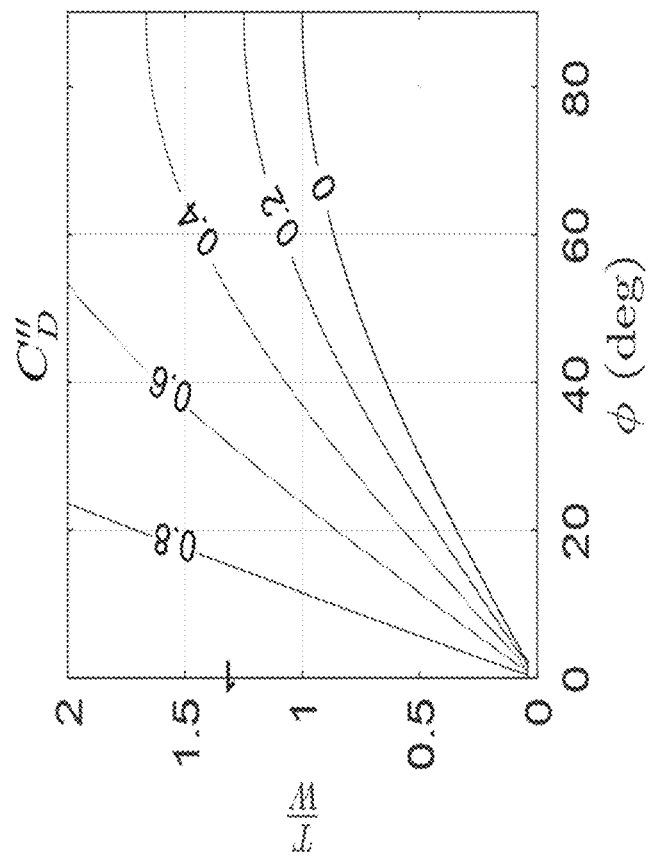
FIG. 4B is a schematic depicting coefficient of drag ($C_D$") values as functions of tilt angle.
Figure 4A:
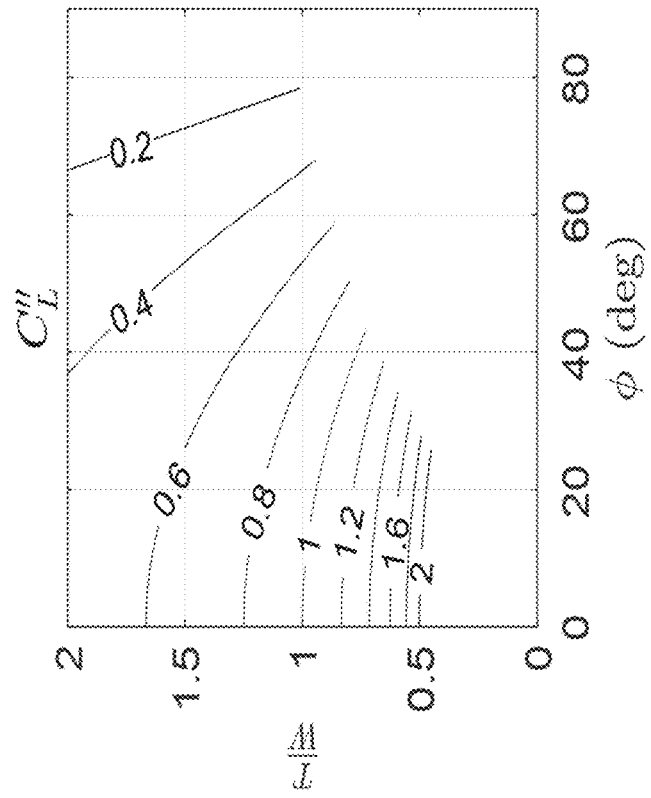
FIG. 4A is a schematic depicting coefficient of lift ($C_L$") values as functions of tilt angle.

FIG. 4A is a schematic of wing lift coefficient required for hovering. FIG. 4B is a schematic of drag coefficient required for hovering. Note that values of $C_L''$ have been limited to "2" for clarity, because values of $C_L''$ increase to infinity when tilt angle ϕ and normalized thrust T/W go to zero.

Figure 5A:
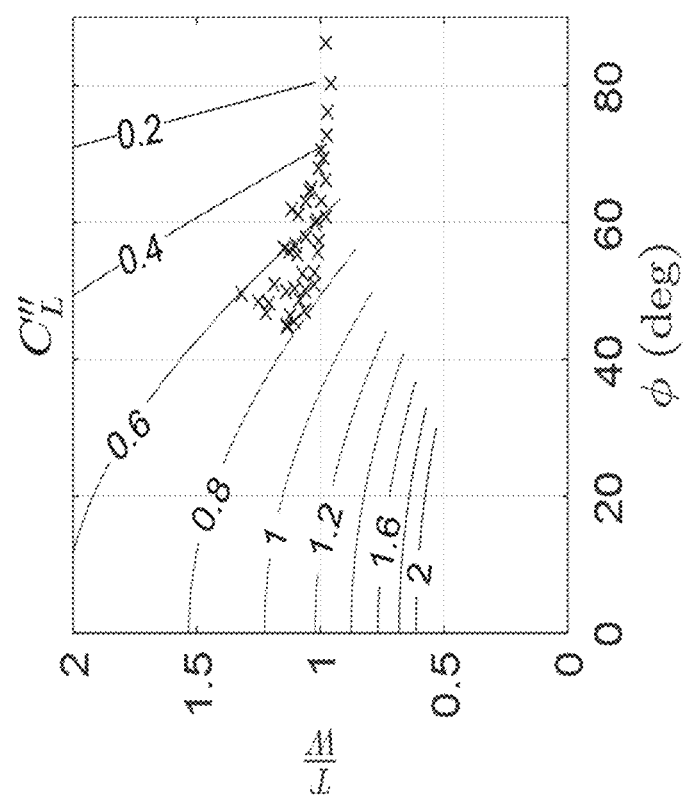
FIG. 5A is a schematic depicting coefficient of lift ($C_L$") values as a function of tilt angle for a double plain flap wing.
Figure 5B:
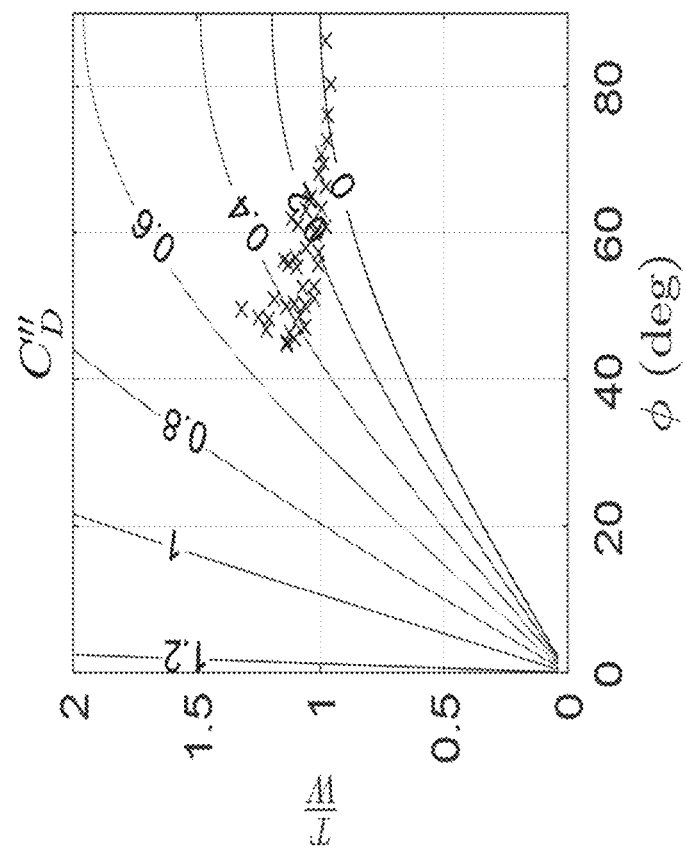
FIG. 5B is a schematic depicting coefficient of lift ($C_D$") values as a function of tilt angle for a double plain flap wing.

Equations 8 and 9 are solved for T/W and ϕ as a function of $C_L''$ and $C_D''$ to facilitate the calculation of minimum required T/W and ϕ given a known achievable $C_L''$ and $C_D''$. FIGS. 5A and 5B illustrate examples of feasible designs with a double plain flap wing having $S_b/A = 0.8157$. Some examples of feasible combinations of T/W and ϕ, based on $C_L''$ and $C_D''$ values extracted from Kuhn and Draper's experiments with a double plain flap wing, are overlaid on FIGS. 5B and 5C. The experimental data suggests that T/W values of less than one are possible due to the benefits of swirl recovery. As discussed above, with respect to single plain flaps, swirl recovery can occur for small deflections and low values of wing drag. For double plain flap wings, however, at low enough flap deflections requiring high tilt angles (ϕ) for hover operations, the swirl recovery outweighs the wing drag and would produce negative drag leading to points in the trimmed-off negative drag region (below $C_D'' = 0$)

$$\frac{T}{W} = \sqrt{\frac{1}{\left(1 - C_D''\frac{S_b}{A}\right)^2 + \left(C_L''\frac{S_b}{A}\right)^2}} \quad (8)$$

$$\phi = \arccos\left(C_L''\frac{T}{W}\frac{S_b}{A}\right) \quad (9)$$

Figure 6B:
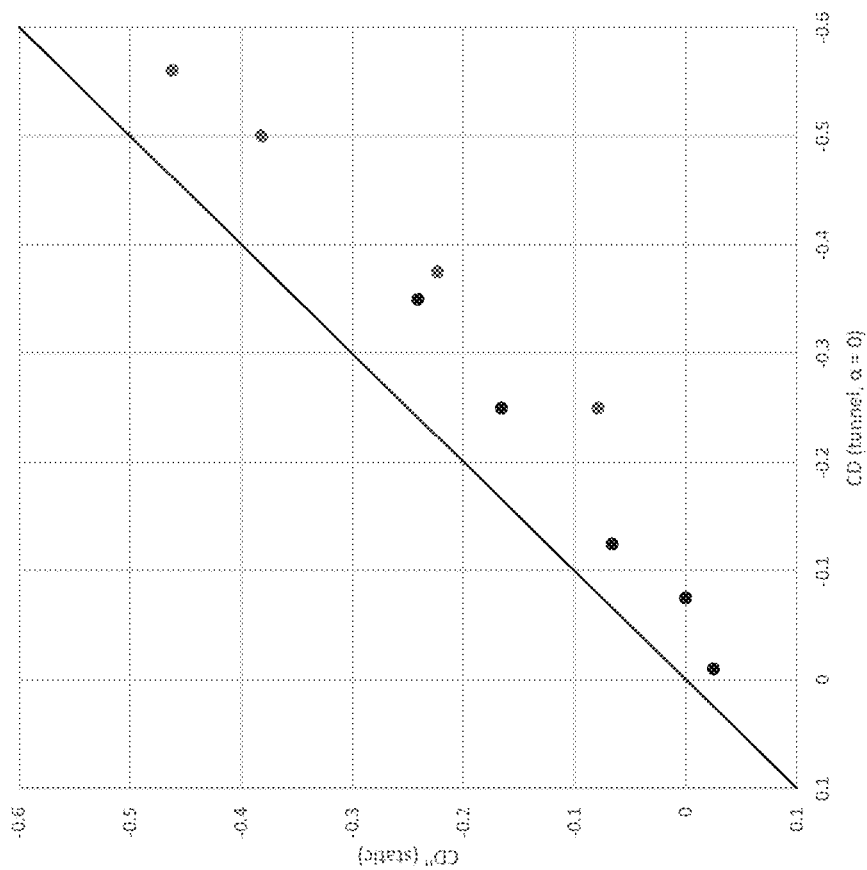
FIG. 6B is a schematic depicting a comparison of drag performance under blown and uniform freestream conditions.

Historically, aerodynamic analysis of wings is performed for the condition of uniform freestream velocity. The present inventors have found that this assumption is no longer valid for blown wings, even if the entire span is blown. For example, FIGS. 6A and 6B compares the performance of a double plain flap wing at various flap settings under uniform freestream conditions versus under fully blown conditions. For each data point, the velocity of the uniform freestream is equal to the velocity of the downstream propeller slipstream as calculated by momentum theory.

Wing Structure Implementations

The wing structure 10 shown in FIG. 1 can be applied to a number of different aircraft, and is not limited to the implementations shown below which are provided for the sake of illustration of the inventive embodiments. When using the deflected stream configuration shown in FIG. 1, flap elements (single plain or double plain) are tilted through large angles with respect to the body axis, but the main wing structure 10 is fixed relative to the fuselage. Meanwhile, as noted above, the entire wing structure 10 with the propulsion system is tilted at angle φ relative to horizontal plane 16, and the flap elements are thereby tilted relative to the fuselage).

However, an aircraft structure of the present invention may have more than one vertical thrust component. For example, three separate mechanisms can be combined to achieve a vertical resultant force: the wing (and therefore propeller) incidence angle relative to the fuselage, the flap design and deflection angle, and the fuselage angle relative to the ground set by the landing gear. Such an aircraft could achieve vertical flight by fixing the wings at an intermediate incidence angle (i.e., at an angle between a near-zero degree angle and a near-90 degree angle of the tiltwing) and would rely on a flap system to deflect the propeller slipstreams to achieve a resultant force solely in the vertical direction.

Indeed, the deflected slipstream VTOL capability is accomplished in a way in which a) wing and propulsor positions are fixed relative to the aircraft fuselage (or a low level of wing tilting that will minimize the amount of wing actuation and/or fuselage rotation required during the transition) and b) flaps are used to turn propulsor slipstreams downward, such that the resultant force acting on the aircraft is vertically upwards. Once airborne, flaps are retracted for transition to efficient cruise flight.

Figure 7A:
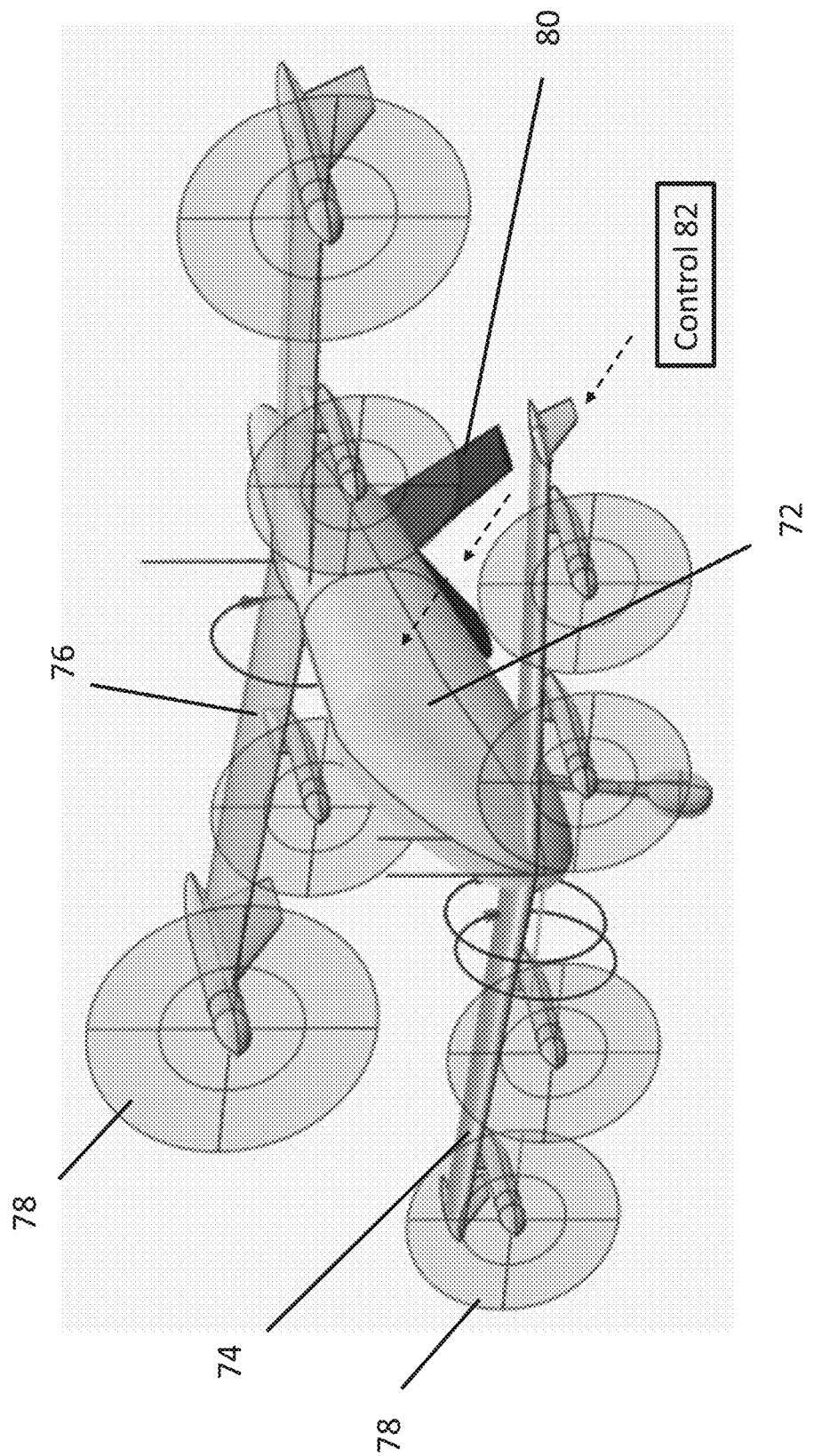
FIG. 7A is a schematic depiction of a VTOL aircraft utilizing the wing structure depicted in FIG. 1.
Figure 7B:
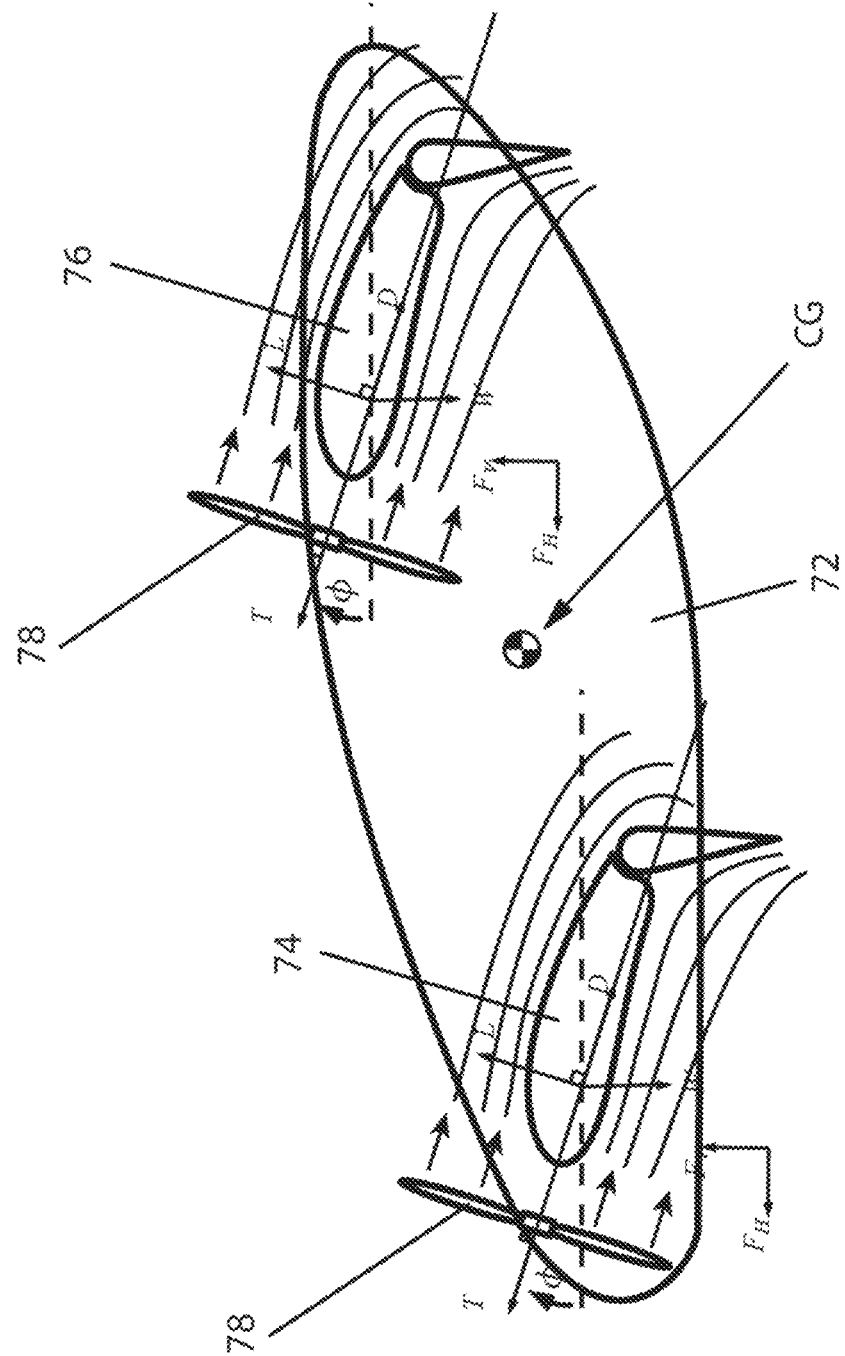
FIG. 7B is a schematic depiction of a side view of the VTOL aircraft in FIG. 7A.

In one implementation of wing structure 10, such a wing structure was combined with a tiltwing on a Langley Aerodrome 8 (LA-8) providing the ability to rotate up to 90 degrees to different wing incidence angles relative to the fuselage. FIG. 7A is a schematic depiction of this aircraft. The fuselage 72 of the aircraft was designed (in this example) to be as small as practical to reduce drag while still maintaining an internal volume for instrumentation and other payload. FIG. 7B is a schematic depiction of a sideview of this aircraft.

In one embodiment of this invention, to increase the aerodynamic efficiency of the configuration, the fuselage 72 was designed to accommodate wings 74, 76 that are offset vertically to minimize interactions between the wake of the front wing 74, the aft wing 76, and propellers 78. However, this vertical wing offset creates an upward taper of the fuselage. To reduce the likelihood of this taper causing additional drag, the fuselage taper angle was set to a relatively low value.

As shown in FIG. 7A, this aircraft included eight (8) propellers 78 in order to increase disk area of the propeller blades and blown wingspan percentage. Having the propellers blow as much of the span as possible reduces the percentage of stalled airfoil sections over the tilting wing in transition and increases the lift generated from the wing in low speed forward flight and vertical flight. In one embodiment of the invention, more than six (6) propellers can be used to distribute propulsion such that substantially all of the wings are externally blown by forced airstreams from the propellers. The propellers are oriented relative to the horizontal plane to produce distributed thrust components laterally along the wings and longitudinally across the aircraft comprising at least a resultant (first) vertical lift component.

In one embodiment of the invention, regardless of the number of propellers, when the flaps are pointed in a downward direction relative to the wing at a flap angle below a retracted position and with the wings fixed at the acute wing angle relative to the horizontal plane, the forced airstream deflected downward by the flaps generates at least a resultant (second) vertical lift component. In this embodiment, the first vertical lift component and the second vertical lift component provide adjustable (controllable) distributed lift components laterally and longitudinally across the aircraft for hovering the vertical take-off and landing aircraft with no aircraft forward speed In one embodiment of the invention, propellers were placed at the wingtips of the aft wing 76 to reduce drag in forward flight. In order to achieve as high as possible wing aspect ratio and have the wingtip propellers blow as much of the span as possible, the wingtip propellers on the aft wing 76 were increased to a 22 in diameter. In one embodiment of the invention, because these wingtip propellers would be operated throughout all phases of flight, there was no requirement for the blades to fold out when rotating, which allowed multiple options for selecting commercial off the shelf wingtip propellers. Accordingly, the distributed propulsion system in one embodiment of the invention comprises at least one propeller disposed at a tip of the wing. In one embodiment of the invention, the e propeller disposed at a tip of the wing both reduces drag in forward flight and aids in a transition between vertical and horizontal flight. Yet, in another embodiment, the outermost propellers do not have to be at the tip.

With six 16 inch diameter propellers and two 22 inch diameter propellers, the disk loading was determined to be 4 lb./ft². In addition, because propellers such as GL-10 propellers can fold, only the two larger wingtip propellers would be utilized during forward flight while all eight propellers would be powered for vertical flight, hover, and transition.

The placement of the six smaller propellers was another important design consideration. These propellers were placed below the wing body axis (chord line). This is preferable to integrating the nacelles (holding the propeller engines) into the wing directly, because the suction peak of the airfoil can be significantly reduced as the airfoil geometry is by modifying the wing to smoothly integrate the nacelle. Such a reduction in the airfoil suction peak can cause a substantial loss in lift, which is detrimental for transition characteristics and the effectiveness of the deflected slipstream concept. Furthermore, because the configuration shown in FIG. 7A employs flaps, placing the propellers below the wing chord line permits an externally blown flap geometry, which can increase the lift generated from the wing and effectively deflect the propeller slipstreams downward. The propeller disc planes were placed one radius ahead of the leading edge of the wing to allow the propellers to use propeller blades configured to folding rearward when not in use. As indicated by the circular arrows around the wings 74, 76, the wings in this design may also rotate as an optional embodiment of the invention.

Additionally, an inverted "V" tail 80 (to be discussed in more detail) is placed beneath fuselage 72.

As shown in FIG. 7B, wherein the wings 74, 76 are disposed at different vertical levels above and below the aircraft center of gravity CG. With this configuration, differential thrust from the propellers on a low wing versus a high wing can produce a controlled longitudinal or pitching moment about the center of gravity during forward flight.

Referring now to FIG. 8, in one embodiment of the invention, to counter wingtip vortices which may induce drag, all the propellers 78 rotate in the direction opposite to the wingtip vortices relative to the symmetry plane, such that the rotation directions of the airflow of the propellers counters the directions of the respective vortices for each of the respective wings, Counter rotation of propellers and wings have been shown to reduce the overall induced drag. Further, by having every propeller on a wing rotate in the same direction, vortex interactions between the propellers are reduced (relative to propellers with rotating them in opposite directions), by rotating the wingtip propellers counter to the wingtip vortex induced drag is reduced, as was previously described. Therefore, all propellers were selected to rotate outwardly downward with respect to the propellers' respective wings, as shown in FIG. 8.

Furthermore, distributed propulsion (such as shown in FIGS. 7A and 8) permits flexibility in the positioning of propellers. In one aspect of the invention, the distribution of propellers in front of the wing can improve propeller slipstream turning effectiveness and lift during hover and transition, while improving handling characteristics such as eliminating buffet due to separation during transition. Multiple smaller propellers (such as shown in FIGS. 7A and 8) are also expected to reduce recirculation of flow through the propellers when in ground effect, thereby improving aerodynamics, reducing noise, and reducing recirculation loading on propellers. Accordingly, the distributed propulsion system in one embodiment comprises propellers of different sizes mounted to the wing or distributed between different wings. However, the distributed propulsion system in another embodiment comprises propellers of the same size.

The deflected slipstream concepts of the present invention are combinable with recent technology advancements such as distributed electric propulsion (DEOP), improved materials, and/or control systems. Namely, the deflected slipstream concepts of the present invention are combinable with distributed electric propulsion and closed loop control laws to enhance control of the VTOL aircraft.

FIG. 7A shows schematically a control 82 for control of the distributed propulsion and having for example closed loop control laws for control of the VTOL aircraft. The closed loop control for this type of VTOL aircraft can be programmed to control the angle of the blown flaps, elevons, and motor RPM during hover and slow forward flight, (e.g. STOL operations) such that aircraft translational and attitude control can be achieved. In other embodiments, pilot translation and attitude inputs are mixed with automatic (non-pilot) corrections from a flight controller to provide for stable aircraft flight. During fast forward flight (i.e. wing-borne flight), flaps are stowed and not used in order to optimize drag.

In one embodiment of this invention, control 82 may accept in five pilot input commands (pitch, roll, yaw, throttle, and flight mode [hover, transition, forward flight]) by remote radio signal. The flight control boards have internal electronic accelerometers and electronic gyros that sense the aircraft vehicle attitude with respect to the vertical gravity vector and can also sense rates of rotation around all three axes. The pilot commands and sensor feedback from the accelerometers and gyros are "mixed" together by an algorithm running on the flight control then distributed to for example eighteen (18) output actuators comprised of 8 motors, 4 elevons, 4 flaps, and 2 ruddervators in predetermined proportions to maintain stable flight.

In one embodiment of this invention, the VTOL aircraft has the ability to precisely and rapidly control the thrust of each motor/propeller (preferably electric motor) independently to maintain the attitude of the aircraft within acceptable bounds during hover and forward flight. In one example, rapid control responds within 100 milliseconds or less to deviations from the acceptable bounds, or in general responds before the forces acting to change the attitude of the aircraft can change the attitude by more than 5° or before the forces acting to change the attitude of the aircraft can change the attitude by more than 2° or before the forces acting to change the attitude of the aircraft can change the attitude by more than 1°. The attitude control can substantially be done by automatic flight control boards and sensors, thus reducing pilot work load dramatically. In addition the aerodynamic surfaces used for attitude control (elevons, ruddervators) can also be automatically sent command signals by the flight controller, that are mixed with the pilot's manual input, to maintain vehicle attitude during hover and forward flight.

Additionally, in another embodiment of the present invention, the same general design concepts can be applied to a conventional takeoff and landing (CTOL) aircraft (i.e., using distributed propulsion to reduce flap size, power, and noise) to design more efficient, and/or low-noise, and/or long-range vehicles.

In one embodiment of the invention, the wing structure 10 can include a single plain flap or a double plain flap. While a single plain flap is not as effective for a fully deflected slipstream, it can still provide flow turning and relatively high lift characteristics.

In one embodiment of the invention, the wing planform designs were set such that, for the front wing span, two propellers are sufficient to effectively blow all of the wing (outside of the fuselage) in their slipstreams. The aft wing span was set in conjunction with the wingtip propeller size selection to maximize its span while still ensuring that a large portion of the span was blown by the propeller. The total wing area in the exemplary aircraft shown in FIGS. 7 and 8 was approximately 80 oz/ft$^2$.

In one embodiment of the invention, the aircraft utilized an inverted "V" tail 80 placed on the bottom of the fuselage below the aft wing. This placement allowed the bottom surfaces of the "V" tail to double as landing gear during the vertical take-off. The dihedral angle inverted "V" tail helps prevent tip over.

In one embodiment of the invention, separate elevons are added to the outboard portions of both wings, as shown in FIG. 9. The elevons are sized at 50% chord length and 35% chord length of the front and aft wings, respectively, to give an approximately equal elevon area on both wings. The relatively large elevon area improves the yaw control authority in vertical flight.

Returning to FIG. 9, wings 12 are mounted to the fuselage to produce the tilt angle φ shown in FIG. 1, fixed at approximately 15 degrees to the horizontal plane, in this example. Motors 2, 3, 6, and 7 were disposed in front of flaps 1, 2, 3, and 4. Motors 1, 4, 5, and 8 were disposed in front of ailerons (or flaperons), 2, 3, and 4, respectively. This configuration achieved open air hover and was able to transition from vertical take-off to horizontal flight with little change in vehicle attitude and with substantially no jerks or accelerations in the forward direction or in the angular disposition of the VTOL aircraft.

FIG. 10 is a schematic depicting another suitable VTOL aircraft utilizing wings 12 were mounted to the fuselage to produce the tilt angle ϕ shown in FIG. 1 and fixed also in this example at approximately 15 degrees to the horizontal plane. Here, the wing planes were divided into more sections with outside motors having a slipstream passing over both an aileron and a flap. This configuration achieved open air hover and was able to transition from vertical take-off to horizontal flight with little change in vehicle attitude and with substantially no jerks or accelerations in the forward direction or in the angular disposition of the VTOL aircraft. In FIGS. 9 and 10, one or more of the depicted ailerons could be or could include flaperons.

Figure 11:
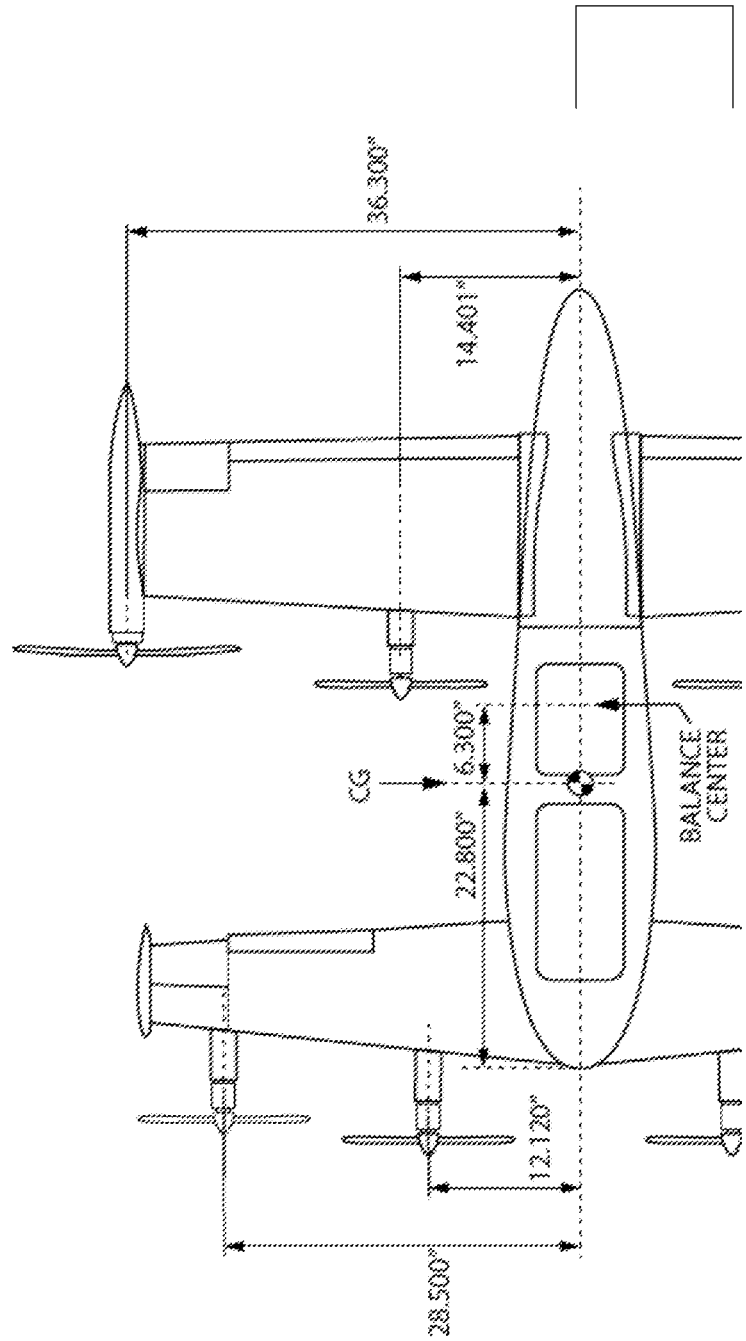
FIG. 11 is a scaled drawing of a VTOL aircraft utilizing the principles of the present invention.

FIG. 11 is a scaled drawing of a VTOL aircraft utilizing the principles of the present invention. This VTOL aircraft was primarily fabricated from a nylon plastic with a carbon fiber and aluminum spar in each wing. This design has eight (8) distributed motors. Four motors on the forward wing and four motors on the aft wing. The flap utilized in this design is a Fowler flap. This VTOL aircraft is capable of both vertical take-off/landing, short take-off and landing (with optional wheeled landing gear) and horizontal flight. For horizontal flight, it had a maximum flying weight of 65 lbs. and a stall speed of approximately 75 ft/sec (52.7 mph) at a fuselage 5° AoA (angle of attack). The motor/propeller combination was capable of producing 17 lbs. of thrust for each of the eight (8) motors, but was limited to 13.6 lbs. each of pilot controlled thrust at 3.4 lbs. the maximum propeller thrust held in reserve by a stabilization system for use upon a maximum pilot commanded thrust. The wing angle in this design is about 75°, much higher than the wing angle specified above because of the relatively small flaps employed in this design.

The designs of the wing structure and the inventive VTOL aircraft noted above permit safe, efficient, and relatively low-noise vertical takeoff and landing (VTOL), through combining two technologies: deflected slipstream VTOL, and distributed propulsion (as noted above preferably distributed electric propulsion DEP). That is the VTOL aircraft of the present invention utilize distributed propellers along a wing equipped with one or more flaps to realize among these and other attributes VTOL capability; preferably efficient cruise flight; preferably ultra-safe, smooth transition to/from vertical flight; and preferably reduced community noise; relative to other VTOL aircraft. Furthermore, in one embodiment of the invention, the same vehicle can perform short takeoff and landing (STOL) operations with higher payload capacity, less energy, or extended range as compared to conventional STOL aircraft. In STOL mode, the flaps are extended, but to a lesser degree than that for VTOL mode. The combined lift forces from free stream wing lift and blowing from propulsors allows for flight below the normal stall speed of the aircraft without blown flaps. This augmented lift provided by the propulsor blown flaps also allows for shorter roll-out distance in takeoff and landing compared to conventional takeoff and landing. In other words, the capability of the inventive VTOL aircraft, permit the same aircraft to be used in STOL operations by adjustment of flap control and throttle without having to change the wing angle.

Hence, by using deflected slipstream techniques, VTOL or V/STOL capabilities are realized that require minimal or no mechanical rotation of the wing or propulsor (which increases weight and complexity) to transition between vertical and cruise flight. Accordingly, the use of tilting wings, tilting propulsors, separate lift and cruise propulsors, and traditional helicopter rotors, as seen on existing VTOL designs, can be eliminated, thus providing benefits in cruise efficiency, weight, noise, reliability, and maintainability. Safe, low-noise, and cost-effective aircraft are important for widespread acceptance of VTOL and urban air mobility (UAM) operations.

General Statements of the Invention

Statement 1. An aircraft (or an aircraft wing configuration or a wing structure) comprising: a plurality of propeller-blown wings a) mounted at different longitudinal locations along a fuselage of the aircraft, b) producing two or more lifting surfaces, c) fixed at a predetermined acute wing angle greater than 0° and substantially less than 90° relative to a horizontal plane, and d) having a plurality of flaps disposed behind the wings; and a plurality of (optionally, individually controlled) propellers distributed in front of the plurality of wings producing two or more lifting surfaces and mounted longitudinally to a fuselage of the aircraft such that (optionally, substantially all of) the wings are externally blown by forced airstreams from the propellers. The propellers (optionally are oriented relative to the horizontal plane to) produce distributed thrust components laterally along the wings and longitudinally across the aircraft comprising at least a resultant first vertical lift component. The plurality of flaps are in the forced airstreams of the propellers when one or more of the flaps is in an extended position. When the flaps are pointed in a downward direction relative to the wing at a flap angle below a retracted position and with the wings fixed at the acute wing angle relative to the horizontal plane, the forced airstream deflected downward by the flaps generates at least a resultant second vertical lift component. The first vertical lift component and the second vertical lift component provide adjustable distributed lift components laterally and longitudinally across the aircraft for hovering the aircraft with no aircraft forward speed during vertical take-off and landing operation.

Statement 2. The aircraft of statement 1, wherein the plurality of propellers distributed in front of the plurality of wings comprise a distributed propulsion system across an entire span of the wings which individually controls each of the propellers in terms of rotational speed and rotational direction.

Statement 3. The aircraft of statement 2, wherein the distributed propulsion system comprises a distributed electric propulsion system utilizing electric motors.

Statement 4. The aircraft of statement 2, wherein the distributed propulsion system comprises propellers of different sizes mounted to the wing or distributed between different wings.

Statement 5. The aircraft of statement 2, wherein the distributed propulsion system comprises at least one propeller disposed at a tip of the wing to propel the forced airstream across an aileron (or flaperon).

Statement 6. The aircraft of statement 2, wherein the distributed propulsion system comprises at least one propeller disposed at a tip of the wing to propel the forced airstream across an aileron (or flaperon) and onto at least a portion of one of the flaps.

Statement 7. The aircraft of statement 2, wherein the distributed propulsion system comprises at least one propeller disposed at a tip of the wing to reduce drag in forward flight and aid in a transition between vertical and horizontal flight.

Statement 8. The aircraft of statement 2, comprising a controller for controlling operation of at least the distributed propulsion system.

Statement 9. The aircraft of statement 8, wherein the controller is configured to control one or more of a flap angle of the flaps, positions of elevons, positions of ailerons, positions of flaperons, and motor RPM speed of the propellers during hover and slow forward flight of the aircraft.

Statement 10. The aircraft of statement 1, wherein, during an open air hover state in which the flaps are pointed substantially downward and the wing is fixed at the acute wing angle relative to the horizontal plane, a resultant force from a lift L of the wing, a slipstream deflection force of the flap, a weight of the aircraft W, a thrust T of the propeller, and a drag D of the wing is dynamically controlled against external forces on the aircraft.

Statement 11. The aircraft of statement 1, wherein the plurality of wings are disposed at different vertical levels above and below the aircraft center of gravity such that differential thrust from the propellers on a low wing versus a high wing produces a longitudinal or pitching moment about the center of gravity during forward flight.

Statement 12. The aircraft of statement 11, wherein the plurality of wings comprises a front wing and an aft wing producing the two or more lifting surfaces.

Statement 13. The aircraft of statement 12, wherein the front wing and the aft wing are disposed at different vertical levels.

Statement 14. The aircraft of statement 12, wherein the front wing and the aft wing are propelled by a distributed propulsion system.

Statement 15. The aircraft of statement 14, wherein the distributed propulsion system individually controls each of the propellers on the front wing and the aft wing in terms of rotational speed and rotational direction.

Statement 16. The aircraft of statement 14, wherein the distributed propulsion system comprises propellers of different sizes mounted to the front wing and mounted to the aft wing.

Statement 17. The aircraft of statement 12, comprising a controller for controlling operation of at least the distributed propulsion system.

Statement 18. The aircraft of statement 17, wherein the controller is configured to control one or more of a flap angle of the flaps, positions of elevons, positions of ailerons, positions of flaperons, and motor RPM speed of the propellers during hover and slow forward flight of the aircraft.

Statement 19. The aircraft of statement 12, wherein propellers disposed at tips of the front wing and the aft wing propel respective forced airstreams across respective ailerons (or flaperons) and/or onto at least a portion of respective ones of the flaps.

Statement 20. The aircraft of statement 1, wherein the first vertical lift component and the second vertical lift component provide for a vertical/short takeoff and landing operation of the aircraft.

Statement 21. A short take-off and landing (STOL) vehicle comprising
a plurality of propeller-blown wings a) mounted at different longitudinal locations along a fuselage of the aircraft, b) producing two or more lifting surfaces, c) fixed at a predetermined acute wing angle greater than 0° and substantially less than 90° relative to a horizontal plane, and d) having a plurality of flaps disposed behind the wings; and
a plurality of propellers a) distributed in front of the plurality of wings producing two or more lifting surfaces and b) mounted such that the wings are externally blown by forced airstreams from the propellers,
wherein
the propellers produce distributed thrust components laterally along the wings and longitudinally across the aircraft comprising at least a resultant first vertical lift component,
the flaps are in the forced airstreams of the propellers when one or more of the flaps is in an extended position,
when the flaps are pointed in a downward direction relative to the wing at a flap angle below a retracted position and with the wings fixed at the acute wing angle relative to the horizontal plane, the forced airstream deflected downward by the flaps generates at least a resultant second vertical lift component, and
a flap angle of the flaps for take-off and landing is set such that the first vertical lift component and the second vertical lift component are not capable of maintaining an altitude of the aircraft with no aircraft forward speed or headwind.

Statement 22. The STOL vehicle of statement 21, wherein the first vertical lift component and the second vertical lift component provide adjustable distributed lift components laterally and longitudinally across the aircraft.

Statement 23. The STOL vehicle of statement 21, wherein the first vertical lift component and the second vertical lift component permit flight below a normal stall speed of an aircraft without blown flaps.

Statement 24. The aircraft of any of statements 1-20 or the STOL vehicle of any of statements 21-23, wherein the wing structure optionally can be rotated relative to the fuselage.

Statement 25. The aircraft of any of statements 1-20 or the STOL vehicle of any of statements 21-23, wherein eight propellers are distributed with four propellers on a front wing and four propellers on an aft wing.

Statement 26. The aircraft of any of statements 1-20 or the STOL vehicle of any of statements 21-23, further comprising an inverted V tail placed on the bottom of the fuselage below the aft wing.

Statement 27. The aircraft of any of statements 1-20 or the STOL vehicle of any of statements 21-23, wherein the inverted V-tail of statement 24 comprises a landing gear during the vertical take-off and a dihedral angle of the inverted V-tail stabilizes the aircraft or STOL aircraft against tip over.

Statement 28. The aircraft of any of statements 1-20 or the STOL vehicle of any of statements 21-23, wherein the deflected slipstream VTOL capability and distributed electric propulsion DEP utilizing distributed propellers along the wing permit a smooth transition to and from vertical flight and horizontal flight with substantially no abrupt accelerations in the forward direction or in the angular disposition.

Statement 29. The aircraft of any of statements 1-20 or the STOL vehicle of any of statements 21-23, having a control which precisely and rapidly controls the thrust of each motor/propeller (preferably electric motor) independently to maintain the attitude of the aircraft within acceptable bounds during hover and forward flight.

Statement 30. The aircraft of any of statements 1-20 or the STOL vehicle of any of statements 21-23, wherein the control of statement 26 responds within 100 milliseconds or less to deviations from predetermined bounds.

Statement 31. The aircraft of any of statements 1-20 or the STOL vehicle of any of statements 21-23, wherein the control of statement 26 responds before external forces acting to change the attitude of the aircraft or the STOL vehicle change the attitude by more than 5° or before the forces acting to change the attitude of the aircraft or the STOL vehicle change the attitude by more than 2° or before the forces acting to change the attitude of the aircraft or the STOL vehicle change the attitude by more than 1°.

Statement 32. The aircraft of any of statements 1-20 or the STOL vehicle of any of statements 21-23, wherein the control of statement 26 comprises electronic accelerometers and/or electronic gyros that sense the aircraft vehicle attitude with respect to vertical gravity vector and sense rates of rotation around all three axes.

Statement 33. The aircraft of any of statements 1-20 or the STOL vehicle of any of statements 21-23, wherein the control of statement 28 is configured to receive pilot commands and sensor feedback from the accelerometers and gyros to maintain stable flight.

Statement 34. The aircraft of any of statements 1-20 or the STOL vehicle of any of statements 21-23, wherein the control of statement 29 is programmed to provide flight control to distributed actuators controlling motors, elevons, flaps, and ruddervators in predetermined proportions to maintain stable flight.

Numerous modifications and variations of the invention are possible in light of the above teachings. It is therefore to be understood that within the scope of the appended claims, the invention may be practiced otherwise than as specifically described herein.

What is claimed is:

1. An aircraft comprising:
a fuselage;
a plurality of propeller-blown wings mounted at different longitudinal locations along the fuselage of the aircraft, the plurality of propeller-blown wings producing two or more lifting surfaces, fixed at a predetermined acute wing angle greater than 0° and substantially less than 90° relative to a horizontal plane, and having a plurality of flaps disposed behind the plurality of propeller-blown wings and deployable between a fully retracted position, wherein the flaps are fixed at the predetermined acute wing angle, and a fully extended position, wherein the flaps are pointed vertically downward at an oblique angle relative to a wing body axis of the wings, wherein the plurality of propeller-blown wings are fixed relative to the fuselage; and
a plurality of propellers distributed in front of the plurality of propeller-blown wings and mounted such that the plurality of propeller-blown wings are externally blown by forced airstreams from the propellers,
wherein
the propellers produce distributed thrust components laterally along the wings and longitudinally across the aircraft comprising at least a resultant first vertical lift component,
the flaps, when in the extended position, are in the forced airstreams of the propellers,
the flaps, when in the extended position and pointed in a downward direction relative to the plurality of propeller-blown wings at a flap angle below a retracted position and with the plurality of propeller-blown wings fixed at the acute wing angle relative to the horizontal plane, deflect the forced airstream downward to negate forward movement of the aircraft and produce a net upward force, thereby generating at least a resultant second vertical lift component, and
the first vertical lift component and the second vertical lift component provide adjustable distributed lift components laterally and longitudinally across the aircraft for hovering the aircraft with no aircraft forward speed during vertical take-off and landing operation.

2. The aircraft of claim 1, wherein the plurality of propellers includes a distributed propulsion system individually controlling, for each of the propellers, a rotational speed and a rotational direction.

3. The aircraft of claim 2, wherein the distributed propulsion system comprises a distributed electric propulsion system including multiple electric motors.

4. The aircraft of claim 1, wherein the plurality of propellers comprises propellers of different sizes are mounted to one of the plurality of propeller-blown wings or distributed between different ones of the plurality of propeller-blown wings.

5. The aircraft of claim 1, wherein the plurality of propellers comprises at least one propeller disposed at a tip of one of the plurality of propeller-blown wings to propel the forced airstream across an aileron or flaperon.

6. The aircraft of claim 1, wherein the plurality of propellers comprises at least one propeller disposed at a tip of one of the plurality of propeller-blown wings to propel the forced airstream across an aileron or flaperon and onto at least a portion of one of the flaps.

7. The aircraft of claim 1, wherein the plurality of propellers comprises at least one propeller disposed at a tip of the wing to reduce drag in forward flight and aid in a transition between vertical and horizontal flight.

8. The aircraft of claim 2, further comprising a flight controller controlling operation of at least the distributed propulsion system.

9. The aircraft of claim 8, wherein the flight controller further controls a flap angle of the flaps, elevon positions of elevons, aileron positions of ailerons, flaperon positions of flaperons, and/or a speed of the propellers during hover and slow forward flight of the aircraft.

10. The aircraft of claim 1, wherein at least two of the plurality of propeller-blown wings are disposed at different vertical levels above and below a center of gravity of the aircraft such that differential thrust from the propellers on a low wing versus a high wing produces a longitudinal or pitching moment about the center of gravity of the aircraft during forward flight.

11. The aircraft of claim 10, wherein the plurality of wings comprises a front wing and an aft wing producing the two or more lifting surfaces.

12. The aircraft of claim 11, wherein the front wing and the aft wing are disposed at the different vertical levels.

13. The aircraft of claim 12, further comprising a distributed propulsion system individually controlling, for each of the propellers on the front wing and the aft wing, a rotational speed and a rotational direction.

14. The aircraft of claim 13, wherein the plurality of propellers comprises propellers of different sizes mounted to the front wing and mounted to the aft wing.

15. The aircraft of claim 13, further comprising a flight controller controlling operation of at least the distributed propulsion system.

16. The aircraft of claim 11, wherein the plurality of propellers comprises propellers disposed at tips of the front wing and the aft wing propelling respective forced airstreams across respective ailerons or flaperons.

17. The aircraft of claim 1, wherein the first vertical lift component and the second vertical lift component provide for a vertical/short takeoff and landing operation of the aircraft.

18. A short take-off and landing (STOL) aircraft comprising:
   a fuselage;
   a plurality of propeller-blown wings a) mounted at different longitudinal locations along the fuselage of the aircraft, b) producing two or more lifting surfaces, c) fixed at a predetermined acute wing angle greater than 0° and substantially less than 90° relative to a horizontal plane, and d) having a plurality of flaps disposed behind the plurality of propeller-blown wings and deployable between a fully retracted position, wherein the flaps are fixed at the predetermined acute wing angle, and a fully extended position, wherein the flaps are pointed vertically downward at an oblique angle relative to a wing body axis of the wings, wherein the plurality of propeller-blown wings are fixed relative to the fuselage; and
   a plurality of propellers a) distributed in front of the plurality of propeller-blown wings and b) mounted such that the plurality of propeller-blown wings are externally blown by forced airstreams from the propellers,
   wherein
   the propellers produce distributed thrust components laterally along the wings and longitudinally across the aircraft comprising at least a resultant first vertical lift component,
   the flaps, when in the extended position, are in the forced airstreams of the propellers, and
   the flaps, when in the extended position and pointed in a downward direction relative to the plurality of propeller-blown wings at a flap angle below a retracted position and with the plurality of propeller-blown wings fixed at the acute wing angle relative to the horizontal plane, deflect the forced airstream downward and thereby generates at least a resultant second vertical lift component.

19. The STOL aircraft of claim 18, wherein the first vertical lift component and the second vertical lift component provide adjustable distributed lift components laterally and longitudinally across the aircraft.

20. The STOL aircraft of claim 18, wherein the first vertical lift component and the second vertical lift component permit flight below a normal stall speed of an aircraft without blown flaps.

* * * * *